US012359426B2

(12) United States Patent
Cecchetto, Jr. et al.

(10) Patent No.: US 12,359,426 B2
(45) Date of Patent: Jul. 15, 2025

(54) WALL CONNECTION SYSTEM

(71) Applicants: Blach Construction Company, San Jose, CA (US); Gregory P. Luth & Associates, Inc., Santa Clara, CA (US)

(72) Inventors: Gino R. Cecchetto, Jr., Woodside, CA (US); Gregory P. Luth, San Jose, CA (US)

(73) Assignees: Blach Construction Company, San Jose, CA (US); Gregory P. Luth & Associates, Inc., Santa Clara, CA (US)

( * ) Notice: Subject to any disclaimer, the term of this patent is extended or adjusted under 35 U.S.C. 154(b) by 0 days.

(21) Appl. No.: 17/943,125

(22) Filed: Sep. 12, 2022

(65) Prior Publication Data

US 2023/0175256 A1 Jun. 8, 2023

Related U.S. Application Data

(63) Continuation of application No. 16/773,665, filed on Jan. 27, 2020, now Pat. No. 11,441,314, which is a (Continued)

(51) Int. Cl.
*E04C 2/38* (2006.01)
*E04B 1/08* (2006.01)
(Continued)

(52) U.S. Cl.
CPC ................ *E04B 2/828* (2013.01); *E04B 1/08* (2013.01); *E04B 2/885* (2013.01); *E04B 2/90* (2013.01);
(Continued)

(58) Field of Classification Search
CPC .... E04C 2/384; E04C 2/40; E04C 2003/0473; E04B 2/96; E04B 2001/389; E04B 2/90;
(Continued)

(56) References Cited

U.S. PATENT DOCUMENTS

| | | | |
|---|---|---|---|
| 1,900,721 | A | 3/1933 | Manske et al. |
| 2,371,921 | A | 3/1945 | Tucker |

(Continued)

FOREIGN PATENT DOCUMENTS

| | | | |
|---|---|---|---|
| GB | 1487244 | A | 9/1977 |
| GB | 1516300 | A | 7/1978 |
| GB | 2232427 | A | 12/1990 |

OTHER PUBLICATIONS

U.S. Patent and Trademark Office, Non-Final Office Action regarding U.S. Appl. No. 17/392,073, dated Sep. 14, 2022, 25 pages.

(Continued)

*Primary Examiner* — Brian E Glessner
*Assistant Examiner* — Daniel J Kenny
(74) *Attorney, Agent, or Firm* — Kolisch Hartwell, P.C.

(57) ABSTRACT

A wall connection system is disclosed, which includes a horizontal building frame component with a first vertical face that has a first slot. The system further includes a prefabricated wall structure with a plurality of parallel studs and an elongate member connect to each stud. The elongate member has a second vertical face with a second slot and is parallel to the first vertical face. The long axis of the first slot is perpendicular to the long axis of the second slot. A fastener assembly connects the horizontal building frame component to the wall structure, through the slots.

19 Claims, 7 Drawing Sheets

Related U.S. Application Data continuation of application No. 15/959,019, filed on Apr. 20, 2018, now Pat. No. 10,544,584.

(60) Provisional application No. 62/488,470, filed on Apr. 21, 2017.

(51) Int. Cl.

| | |
|---|---|
| ***E04B 2/82*** | (2006.01) |
| ***E04B 2/88*** | (2006.01) |
| ***E04B 2/90*** | (2006.01) |
| ***E04B 2/96*** | (2006.01) |
| ***E06B 3/54*** | (2006.01) |
| *E04B 2/58* | (2006.01) |

(52) U.S. Cl.
CPC .............. *E04B 2/96* (2013.01); *E06B 3/5427* (2013.01); *E04B 2/58* (2013.01); *E04C 2/384* (2013.01)

(58) Field of Classification Search
CPC . E04B 2/828; E04B 1/08; E04B 2/885; E06B 3/5427
See application file for complete search history.

(56) References Cited

U.S. PATENT DOCUMENTS

| | | | | |
|---|---|---|---|---|
| 2,856,646 | A | 10/1958 | Latimer | |
| 3,001,615 | A * | 9/1961 | Ries | E04B 2/76 D25/61 |
| 3,110,131 | A | 11/1963 | Jeffress | |
| 3,172,507 | A | 3/1965 | Blyveis | |
| 3,368,016 | A | 2/1968 | Birguer | |
| 3,849,012 | A | 11/1974 | Krouse | |
| 3,994,107 | A | 11/1976 | Aughuet | |
| 4,071,988 | A | 2/1978 | Bowes | |
| 4,073,107 | A | 2/1978 | Rousseau | |
| 4,075,814 | A | 2/1978 | Theurer et al. | |
| 4,141,188 | A | 2/1979 | Sukolics | |
| 4,192,481 | A | 3/1980 | Durbin | |
| 4,194,333 | A | 3/1980 | Paton et al. | |
| 4,398,378 | A | 8/1983 | Heitzman | |
| 4,506,482 | A | 3/1985 | Pracht et al. | |
| 4,563,851 | A | 1/1986 | Long | |
| 4,905,444 | A | 3/1990 | Semaan et al. | |
| 5,359,958 | A | 11/1994 | Guild | |
| 5,617,685 | A | 4/1997 | Meier et al. | |
| 6,003,280 | A | 12/1999 | Wells | |
| 6,012,699 | A | 1/2000 | Wu et al. | |
| 6,058,668 | A | 5/2000 | Herren | |
| 6,216,405 | B1 | 4/2001 | Smith | |
| 6,240,682 | B1 | 6/2001 | James et al. | |
| 6,470,644 | B2 | 10/2002 | James et al. | |
| 6,503,025 | B1 | 1/2003 | Miller | |
| 6,550,213 | B1 | 4/2003 | Butler | |
| 7,596,923 | B1 | 10/2009 | Thomas et al. | |
| 7,802,406 | B2 | 9/2010 | Simmons | |
| 7,866,108 | B2 | 1/2011 | Klein | |
| 8,312,678 | B1 | 11/2012 | Haddock | |
| 8,474,220 | B2 | 7/2013 | Svensson | |
| 8,528,296 | B1 | 9/2013 | Miller | |
| 8,555,592 | B2 | 10/2013 | Daudet et al. | |
| 8,763,328 | B2 | 7/2014 | Tuttle | |
| 8,857,116 | B2 * | 10/2014 | Henriquez | E04B 1/161 52/506.05 |
| 9,032,681 | B1 | 5/2015 | Brady | |
| 9,663,961 | B2 | 5/2017 | Moeller et al. | |
| 9,915,064 | B1 | 3/2018 | Sanders et al. | |
| 10,119,265 | B2 | 11/2018 | Higgins | |
| 10,196,808 | B1 | 2/2019 | Gibbs et al. | |
| 10,260,228 | B2 | 4/2019 | King et al. | |
| 10,544,585 | B2 | 1/2020 | Cecchetto, Jr. et al. | |
| 10,550,565 | B2 | 2/2020 | Heatly | |
| 10,584,479 | B2 | 3/2020 | Saenz Saenz | |
| 10,731,329 | B1 | 8/2020 | Novikov et al. | |
| 11,078,660 | B2 | 8/2021 | Cecchetto, Jr. et al. | |
| 11,142,900 | B2 | 10/2021 | Ishaq | |
| 2001/0025458 | A1 | 10/2001 | James et al. | |
| 2003/0131544 | A1 | 7/2003 | Miller | |
| 2003/0233798 | A1 | 12/2003 | Berkey et al. | |
| 2005/0252149 | A1 | 11/2005 | Ritchey et al. | |
| 2008/0222976 | A1 | 9/2008 | Liskey | |
| 2010/0115880 | A1 | 5/2010 | Svensson | |
| 2011/0203217 | A1 | 8/2011 | Dayton et al. | |
| 2017/0130444 | A1 | 5/2017 | Higgins | |
| 2018/0163391 | A1 | 6/2018 | King et al. | |
| 2018/0328034 | A1 | 11/2018 | Cecchetto, Jr. et al. | |
| 2018/0371742 | A1 | 12/2018 | Saenz Saenz | |
| 2019/0010700 | A1 | 1/2019 | Webb et al. | |
| 2019/0257081 | A1 | 8/2019 | Heatly | |
| 2020/0048892 | A1 | 2/2020 | Cecchetto, Jr. et al. | |
| 2022/0136229 | A1 | 5/2022 | Tompane | |
| 2022/0136241 | A1 | 5/2022 | Tompane | |
| 2022/0213684 | A1 | 7/2022 | Besjak et al. | |

OTHER PUBLICATIONS

U.S. Patent and Trademark Office, Non-Final Office Action in U.S. Appl. No. 15/959,019, dated Oct. 18, 2018, 12 pages.
U.S. Patent and Trademark Office, Non-Final Office Action in U.S. Appl. No. 15/959,019, dated May 14, 2019, 8 pages.
U.S. Patent and Trademark Office, Non-Final Office Action regarding U.S. Appl. No. 15/975,089, dated May 22, 2019, 10 pages.
U.S. Patent and Trademark Office, Final Office Action regarding U.S. Appl. No. 16/773,820, dated Nov. 17, 2020, 16 pages.
U.S. Patent and Trademark Office, Final Office Action regarding U.S. Appl. No. 17/392,073, dated Apr. 12, 2023, 9 pages.
U.S. Patent and Trademark Office, Non-Final Office Action regarding U.S. Appl. No. 16/773,665, dated Oct. 7, 2020, 17 pages.
U.S. Patent and Trademark Office, Final Office Action regarding U.S. Appl. No. 16/773,665, dated Jan. 21, 2021, 16 pages.
U.S. Patent and Trademark Office, Non-Final Office Action regarding U.S. Appl. No. 16/773,665, dated Jun. 9, 2021, 7 pages.
U.S. Patent and Trademark Office, Final Office Action regarding U.S. Appl. No. 16/773,665, dated Dec. 10, 2021, 9 pages.
U.S. Patent and Trademark Office, Non-Final Office Action regarding U.S. Appl. No. 16/539,964, dated Nov. 24, 2020, 26 pages.
U.S. Patent and Trademark Office, Non-Final Office Action regarding U.S. Appl. No. 16/773,820 dated Jul. 31, 2020, 13 pages.

* cited by examiner

WALL CONNECTION SYSTEM

CROSS-REFERENCES

This application is a continuation of U.S. patent application Ser. No. 16/773,665, filed, Jan. 27, 2020, issued as U.S. Pat. No. 11,441,314 on Sep. 13, 2022, which is a continuation of U.S. patent application Ser. No. 15/959,019, filed Apr. 20, 2018, issued as U.S. Pat. No. 10,544,584 on Jan. 28, 2020, which claims priority from U.S. Provisional Patent Application Ser. No. 62/488,470, filed Apr. 21, 2017. The complete disclosures of each application are hereby incorporated by reference in their entireties for all purposes.

INTRODUCTION

Panelized buildings, also known as prefabricated buildings, offer a flexible and cost-efficient alternative to traditionally constructed buildings. Such buildings are being used in a wider variety of applications including schools, office buildings, medical buildings, and even residential housing. Panelization allows a portion of welding and other construction work to be performed prior to building erection, reducing on-site work. Work performed off-site simplifies scheduling, reduces construction costs, is performed under controlled conditions, and is generally of higher quality.

The framing structure of a panelized building is generally assembled from steel beams, with an external cladding of metal studs, wood, precast concrete, glass curtainwall, or other materials. Prefabricated wall panels are fastened to the steel frame, with clips attaching each wall panel stud to a beam. This attachment must both support structural loads and allow for movement during seismic events. Over the multiple wall panels of a building, there can be hundreds or thousands of clips requiring individual installation. A simple attachment system is desirable, to reduce installation time and construction cost.

SUMMARY

The present disclosure provides systems, apparatuses, and methods relating to wall connection. In some embodiments, a wall connection system may include a horizontal building frame component with a first vertical face that has a first slot. The system may further include a prefabricated wall structure with a plurality of parallel studs and an elongate member connected to each stud. The elongate member may have a second vertical face with a second slot and may be parallel to the first vertical face. The long axis of the first slot may be perpendicular to the long axis of the second slot. A fastener assembly may connect the horizontal building frame component to the wall structure, through the slots.

In some embodiments a modular wall panel assembly may include a plurality of parallel studs defining a primary wall plane. A strongback structure may be connected orthogonally to the studs, and may include an expanse oriented parallel to the wall plan. The expanse may have a slot configured to receive a threaded bolt for fastening the wall panel assembly to a building structure without directly connecting the studs to the building structure.

A method of connecting a prefabricated wall structure to a building frame may include fixing an elongate member to each stud of a plurality of parallel studs of the wall structure, the elongate member having a first vertical face with a first slot. The method may further include lifting the wall structure proximate the building frame with the first vertical face of the elongate member parallel to a second vertical face of a horizontal building frame component, the second vertical face having a second slot. The method may further include extending a fastener assembly through the first slot and the second slot, and securing the fastener assembly.

DETAILED DESCRIPTION

This disclosure provides numerous selected examples of invented devices for connecting wall structures to a building frame. Many alternatives and modifications which may or may not be expressly mentioned, are enabled, implied, currently possessed, and are supported by the disclosure.

Figure 1:
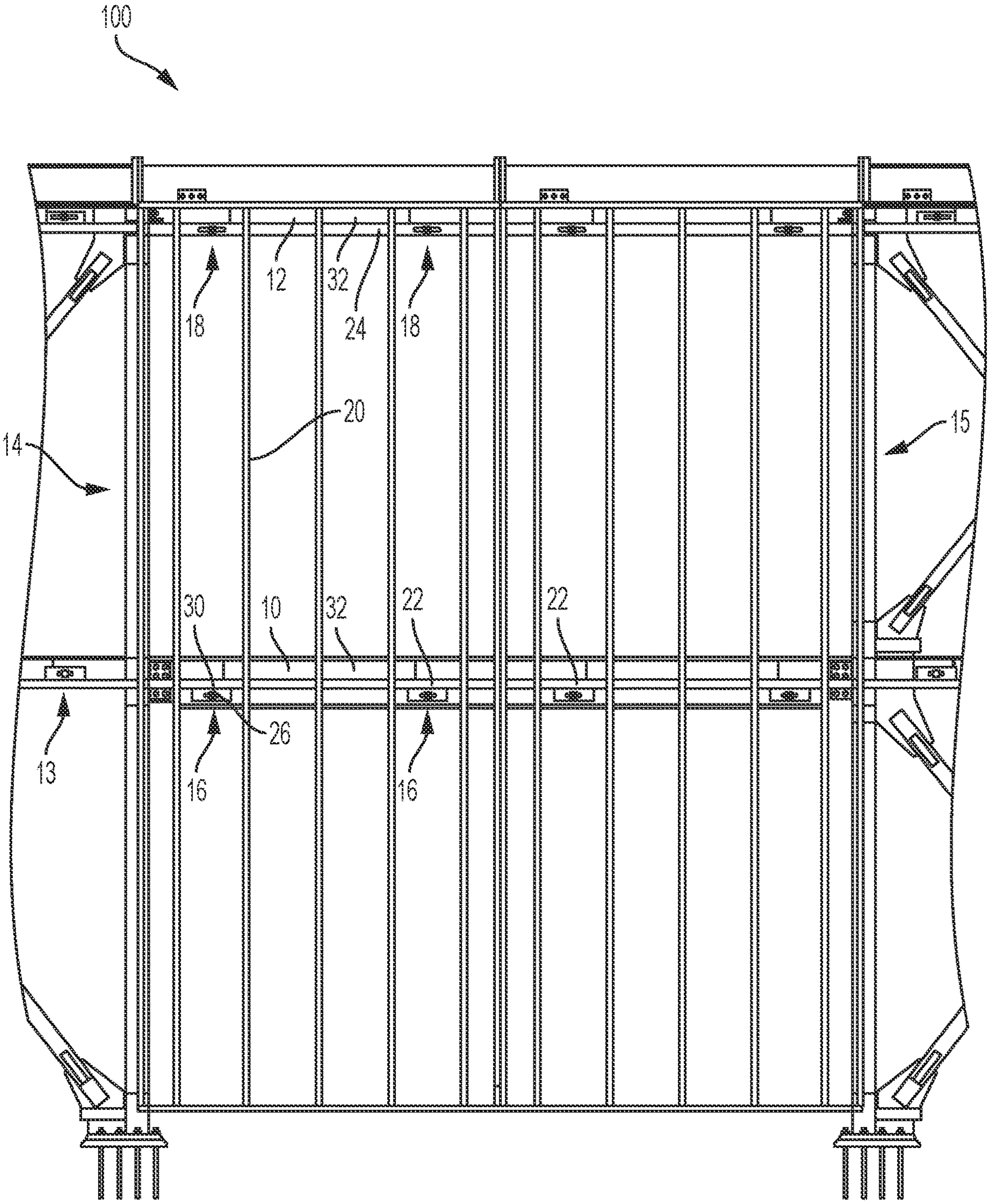
FIG. 1 is an elevation view of an embodiment of a wall connection system.

A prefabricated wall panel may be attached to a building frame by a wall connection system. FIG. 1 shows an illustrative embodiment of a connection system for a two-story building, generally indicated at 100. A prefabricated wall panel 14 is connected to a building frame 13 including a lower horizontal building frame component 10 and an upper horizontal building frame component 12. The wall panel is connected to the building frame at two lower attachment points 16 and at two upper attachment points 18. Wall panel 14 may also be referred to as a modular wall panel assembly and/or a prefabricated modular wall structure. In some examples, wall panel 14 may be a glazing panel.

Wall panel 14 is secured to building frame 13 by connection system 100, while allowing relative motion between the building frame and wall panel. The building frame may be able to move within attached wall panels in both a horizontal and a vertical direction, as required by building code. In other words, relative movement between the wall panel and the building frame may be permitted parallel to the plane of the wall panel, but prevented perpendicular to the plane of the wall panel.

The horizontal building frame components may comprise any appropriate building frame material, such as steel, concrete, or timber. The components may include any structural members, such as beams, trusses, or joists. The wall panel may attach to only one horizontal building frame component, or to any number of components. The wall panel may also connect to a horizontal building frame component by one or any number of attachment points. Preferably, the number of attachment points may be fewer than a number of studs in the wall panel.

In the present example, horizontal building frame components 10, 12 are steel !-beams. The web of each beam includes two elongate slots 28, which are not visible in FIG. 1, but can be seen in FIGS. 3, 4, 6, and 7. Each beam 10, 12 has a vertical face 32 that includes slots 28. In the present example, vertical face 32 is the web of the I-beams. In some examples, vertical face 32 may be a face of a timber beam, a leg of an angle iron fastened to a beam, or any vertical surface on a horizontal building frame component and/or attached structure.

When connected to building frame 13, wall panel 14 may be disposed such that the studs of the wall panel are parallel to each vertical face 32. Slots 28 extend vertically relative to building frame 13, and generally perpendicular to the extent of the I-beam. The slots of each I-beam may define a vertical range of relative motion between wall panel 14 and the I-beam, and the length of the slot may be selected according to a required range of motion.

Figure 2:
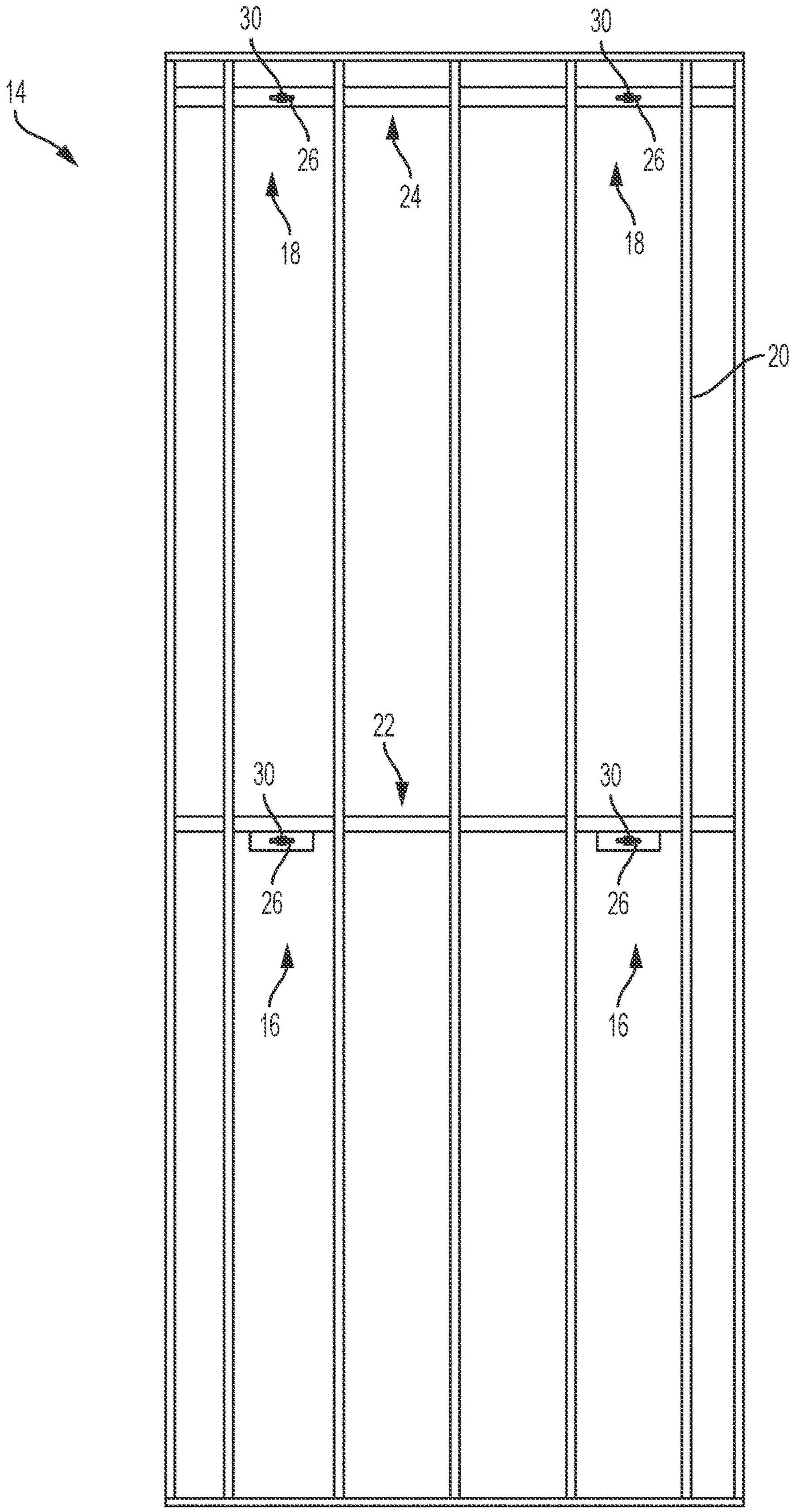
FIG. 2 is an elevation view of a prefabricated wall panel of the wall connection system of FIG. 1.

As shown in FIG. 2, wall panel 14 includes a plurality of parallel studs 20 and two elongate members 22, 24. The parallel studs may be described as defining a primary wall plane of the panel. The elongate members, which may be referred to as strongbacks, collect the studs for attachment to the building frame. Each strongback includes two elongate slots 26, that extend horizontally relative to the wall panel and generally parallel to the extent of the strongback. Each of slots 26 may be described as configured to be orthogonal relative to a corresponding slot in a member of the building frame.

Each strongback is coupled to each stud of the plurality of studs 20 of wall panel 14. Strongbacks may be coupled to the studs in any effective manner. For example, strongbacks may be welded to metal studs or screwed to timber studs. In some examples, the wall panel or wall structure may include a different frame structure from studs. For instance, a glass wall panel may include curtain wall framing instead of studs, and strongbacks may be clipped to the curtain wall framing.

In the present example, strongback 22 differs from strongback 24. Strongback 22 includes a tube and sections or pieces of angle iron, while strongback 24 comprises a single length of angle iron. Any effective components may be included in a strongback.

Alternative reinforcing members may be used, and the strongbacks may be composed of any metal or other material with appropriate structural properties. Different strongbacks may confer different advantages, and may be appropriate to different buildings and/or placements within a building. A wall connection system may include multiple strongbacks of a single type, strongbacks of two or more types, or any effective combination of strongback designs.

A fastener assembly 30 attaches a strongback to a beam at each attachment point 16, 18. Referring again to FIG. 1, strongback 22 is attached to lower beam 10 at lower attachment points 16, and strongback 24 is attached to upper beam 12 at upper attachment points 18. Each attachment point comprises a horizontal slot 26 aligned with a vertical slot 28, and a fastener assembly 30 that extends through the slots.

Fastener assemblies 30 may be of sufficient length to space strongbacks 22, 24 and thus wall panel 14 from beams 10, 12. This spacing may be appropriate to accommodate columns or other structural components of the building between the wall panel and beams. An appropriate length for fastener assemblies 30 may be selected for a particular building according to that building's structure. In general, a wall structure connected to a horizontal building frame component by a wall connection system may be spaced at least approximately 2 inches, or at least approximately 4 inches from the horizontal component. The wall structure may be spaced as appropriate for the desired stand-off from the wall structure to the building frame.

Fastener assemblies 30 may be configured to accommodate both push and pull forces. In other words, the fastener assemblies may resist forces applied parallel to the length of the fastener assembly, in either direction. The fastener assemblies may be configured to move within slot 26 and/or 28 in response to forces applied perpendicular to the length of the fastener assembly. The fastener assemblies may be configured to fasten wall panel 14 to building frame 13 without directly connecting studs 20 of the wall panel to the building frame. Fastener assemblies 30 may also be configured to allow precise location and adjustment of wall panel 14 perpendicularly and/or longitudinally relative to building frame 13.

In the present example, fastener assemblies 30 are separate from wall panel 14 and building frame 13, prior to connection of the wall panel to the building frame. In some examples, fastener assemblies 30 may be pre-fastened to wall panel 14 as part of the manufacture of the wall panel. In such examples, the fastener assemblies may be removably or permanently fixed to the strongbacks of the wall panel.

Other examples of a wall connection system may be appropriate to buildings of three or more stories, and include 3 or more strongbacks. In some embodiments strongback slots 26 may be vertical, and accordingly beam slots 28 may be horizontal. In other embodiments, three or more upper attachment points may be included, similarly three or more lower attachment points may be included.

Dimensions and materials of each component of a connection system may be selected to fit a particular building. For example, on a wall panel with 6-inch studs, a strongback may measure 4 inches by 4 inches. For another example, for a beam having a flange width of 6 inches and a strongback measuring 3 inches by 3 inches, a fastener assembly may have a length of at least 10 inches. A wall connection system appropriate to high-rise buildings may use steel strongbacks, while a system appropriate to a garden shed may use timber strongbacks.

Figure 3:
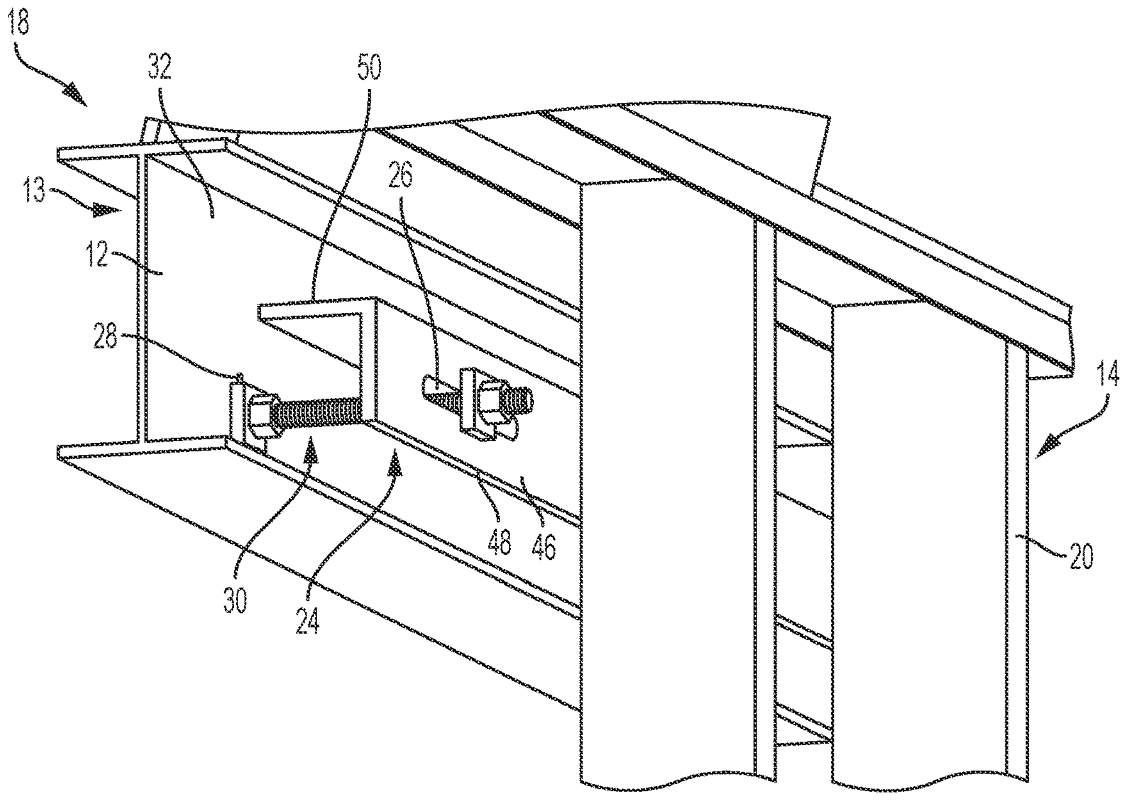
FIG. 3 is a cut-away isometric view of an upper attachment point of the wall connection system of FIG. 1.
Figure 4:
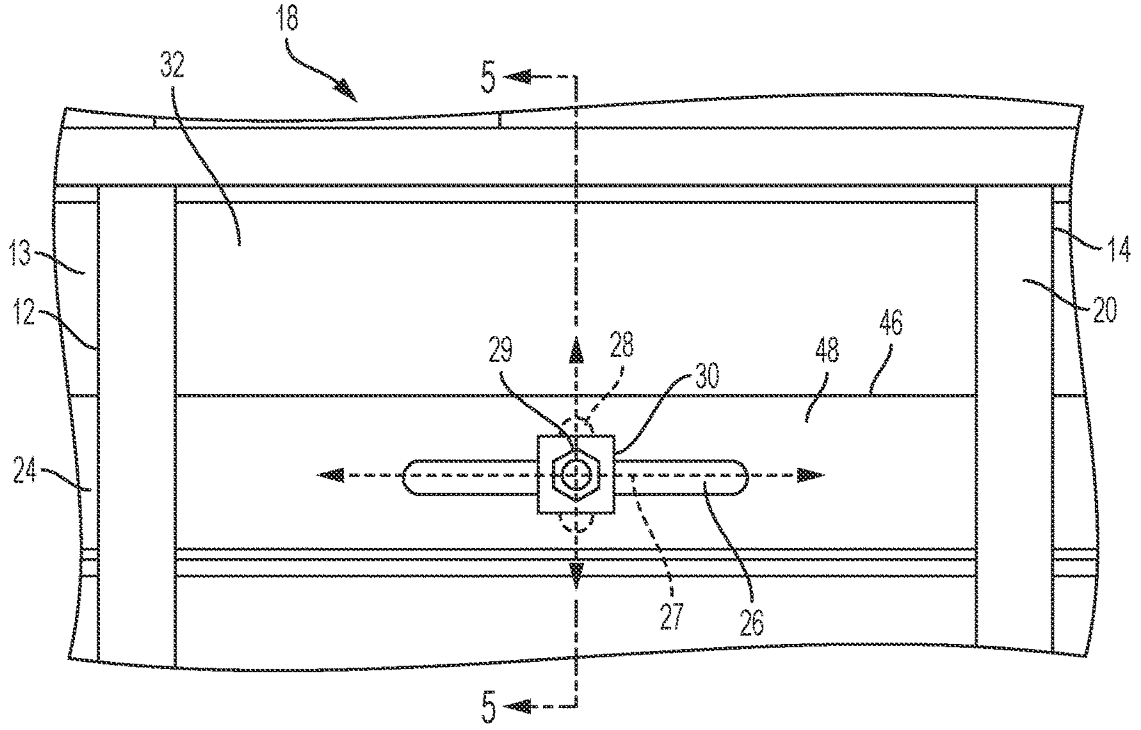
FIG. 4 is an elevation view of the upper attachment point of FIG. 3.
Figure 5:
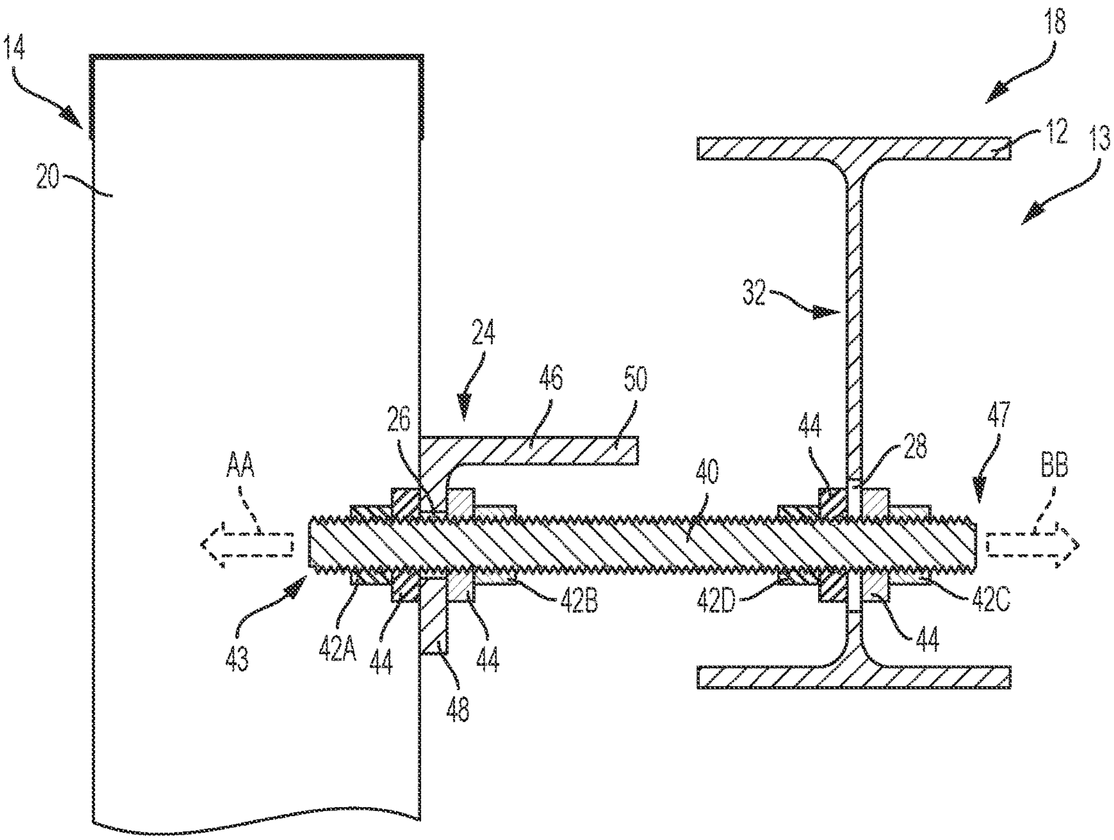
FIG. 5 is a cross-sectional view of the upper attachment point of FIG. 3, along line 5-5 in FIG. 4.

FIGS. 3-5 are several views of an upper attachment point 18, including a slot 26 of strongback 24, a slot 28 of beam 12, and a fastener assembly 30. The two upper attachment points 18 are substantially the same, and the below description may be sufficient to describe both. Strongback 24 comprises an angle iron 46, directly connected to each of the plurality of studs 20 on an inner side of wall panel 14. That is, the strongback is disposed substantially perpendicular to the studs, between the studs and adjacent beam 12. The angle iron may be welded, screwed, or attached to the studs by any other appropriate method.

Angle iron 46 has a first leg 48 and a second leg 50. The first leg, which may be referred to as a vertical face of strongback 24, is substantially parallel to vertical face 32 of beam 12. First leg 48 is also parallel to the inner side of wall panel 14, and is fixed to studs 20. Vertical face 32 may also be referred to as an expanse orientated parallel to the primary wall pane of wall panel 14. In some examples, wall panel 14 and/or building frame 13 may vary from planar or square geometry by some tolerance. In such examples, vertical face 32 and first leg 48 may accordingly vary from parallel alignment by a similar tolerance.

As shown in FIG. 4, first leg 48 includes a slot 26 with a long axis 27, and vertical face 32 of beam 12 includes a slot 28 with a long axis 29. Long axis 27 is horizontal, while long axis 29 is vertical. The two axes are substantially perpendicular. Slot 26 is located on strongback 24 such that the slot is disposed between adjacent studs 20. Slot 26 is also spaced from, but aligned with slot 28. Each slot is configured to receive fastener assembly 30.

Slot 26 has a horizontal length, and a vertical width. In the depicted example, slot 26 is approximately ¾ inches in width and 9 inches in length. The vertical width of slot 26 may be appropriate to receive fastener assembly 30. The horizontal length of slot 26 may determine a range of relative range of motion between wall panel 14 and beam 12. The appropriate range of motion may depend on the building, the location of attachment point 18 within the building, seismic construction regulations, and/or other such factors. In the present example, the location of attachment point 18 adjacent the roofline of the building may require a greater range of motion and therefore a greater horizontal length of slot 26. Slot 28 has a vertical length, and a horizontal width. In the depicted example, slot 28 is approximately ¾ inches in width and 3 inches in length. The horizontal width of slot 28 may be appropriate to receive fastener assembly 30. The vertical length of slot 28 may determine a range of relative range of motion between wall panel 14 and beam 12. Similarly to slot 26, as described above, the appropriate range of motion may vary. Location of slot 28 in vertical face 32 may also vary with other dimensions or attributes of the building. In the depicted example, slot 28 is centered approximately 2 and ⅝ inches from the bottom flange of beam 12.

Fastener assembly 30, which may be seen in greatest detail in FIG. 5, includes a threaded rod 40. Rod 40 extends through slot 26 of strongback 24 and slot 28 of beam 12. The rod extends substantially perpendicular to vertical face 32 of beam 10 and to first leg 38 of angle iron 46. Rod 40 may also be described as perpendicular to the plane of wall panel 14. Four nuts 42 are threaded onto the rod to secure fastener assembly 30 relative to strongback 24 and beam 12. Each nut is spaced from the adjacent structural member by a washer 44.

Rod 40 may be described as having a panel end 43 and a beam end 47. A first nut 42A is disposed proximate panel end 43 of rod 40, proximate first leg 48 of angle iron 46.

A second nut 42B is also disposed proximate panel end 43 of the rod, on an opposite side of first leg 48 to first nut 42A. In other words, first nut 42A is distal to second nut 42B, on rod 40. Rod 40 is fixed relative to angle iron 46 between the first and second nuts.

A third nut 42C is disposed proximate beam end 47 of rod 40, proximate vertical face 32 of beam 12. A fourth nut 42D is also disposed proximate beam end 47 of the rod, on an opposite side of beam 12 to third nut 42C. In other words, third nut 42C is distal to fourth nut 42D, on rod 40. Rod 40 is fixed relative to beam 12 between the third and fourth nuts.

Each nut may be tightened only to ‘hand-tight’, or to some selected torque value. Limiting the tightness of the nut may secure rod 40 along the length of the rod, while allowing the rod to slide along slot 26 and/or slot 28. In other words, fastener assembly 30 may prevent relative motion between wall panel 14 and building frame 13 perpendicular to the plane of the wall panel, while allowing motion parallel to the plane of the wall panel.

Washers 44 may facilitate motion of rod 40 within slots 26, 28 by reducing frictional forces between the fastener assembly and beam 12 and/or strongback 24. In some examples, the beam and/or strongback may include other features configured to reduce frictional forces such as smoothed surfaces or welded surface plates.

Rod 40 may be of sufficient length to flex under loads experienced by the building. Flexure of the rod may allow additional movement between wall panel 14 and building frame 13. In other words, fastener assembly 30 may permit relative motion of the wall panel and building frame through both sliding and flexing motion of rod 40.

In the present example, rod 40 is approximately 12 inches in length. This length allows sufficient clearance between angle iron 46 and the flanges of beam 12 and appropriately spaces studs 20 from the beam, in addition to providing desired flexure.

Rod 40 may be of any effective length. In some examples, effective lengths may be between approximately 3 inches and 3 feet. A rod under 3 inches may provide insufficient clearance between strongback 24 and beam 12, while a rod over 3 feet may flex excessively or take damage from seismic activity or other building loads.

In the present example, rod 40 has a % inch diameter. Rod 40 may be of any effective diameter. The diameter may be selected for a desired stiffness, or resistance to flexing of rod 40. The diameter may also be selected for a desired load capacity. A % inch diameter rod is a standard size, which may ensure that rod 40, nuts 42, and washers 44 are easily obtainable at a low cost. In some examples, fastener assembly 30 may include only standard hardware components. In some examples, fastener assembly 30 may include some or all custom components.

Any effective fastener or combination of fasteners may be included in fastener assembly 30. For example, the fastener assembly may include a bolt and one nut, with shims to facilitate adjustment. For another example, fastener assembly 30 may include a threaded rod and two nuts. A nut may be disposed at each end of the rod, with each nut distal of the adjacent connected structural member.

Fastener assembly 30 may be a push-pull fastener. In FIG. 5, arrow AA indicates a push force, while arrow BB in the opposite direction indicates a pull force. Both forces are exerted parallel to the length of the fastener assembly. Fastener assembly 30 may be configured to resist both push and pull forces. In other words, fastener assembly 30 may be configured to prevent two connected structures from moving either closer to or farther from one another.

Figure 6:
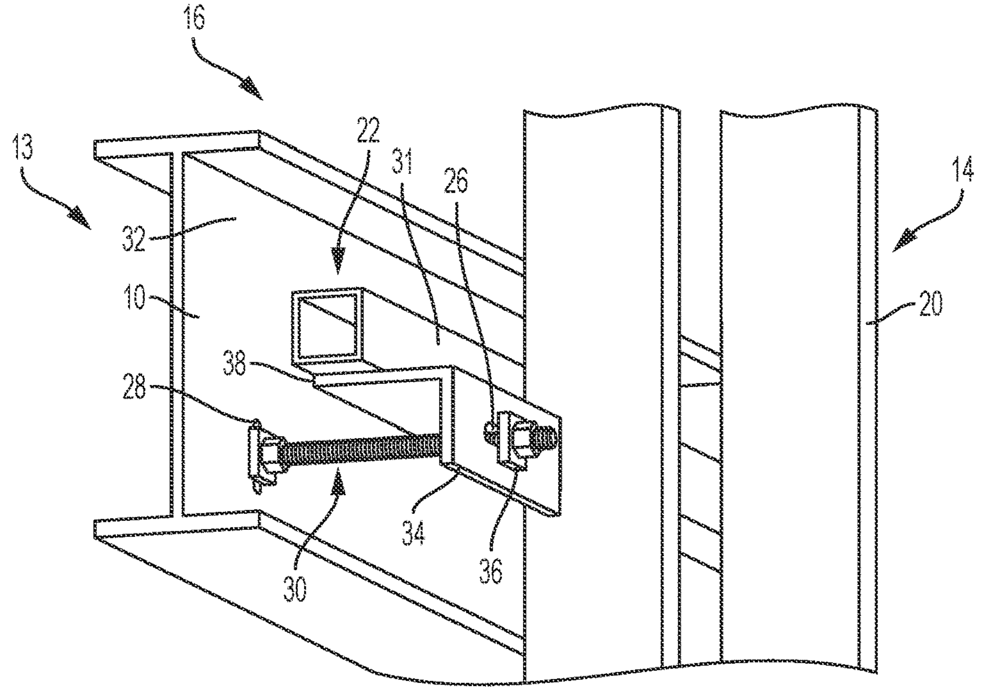
FIG. 6 is a cut-away isometric view of a lower attachment point of the wall connection system of FIG. 3.
Figure 7:
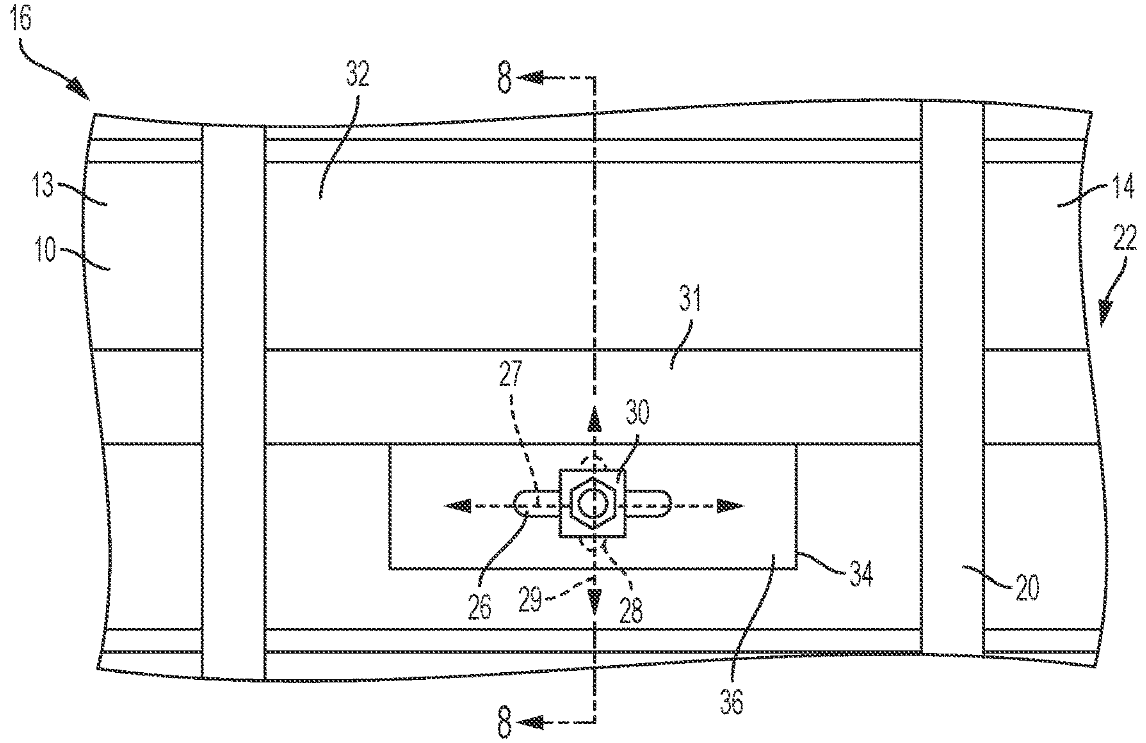
FIG. 7 is an elevation view of the lower attachment point of FIG. 6.
Figure 8:
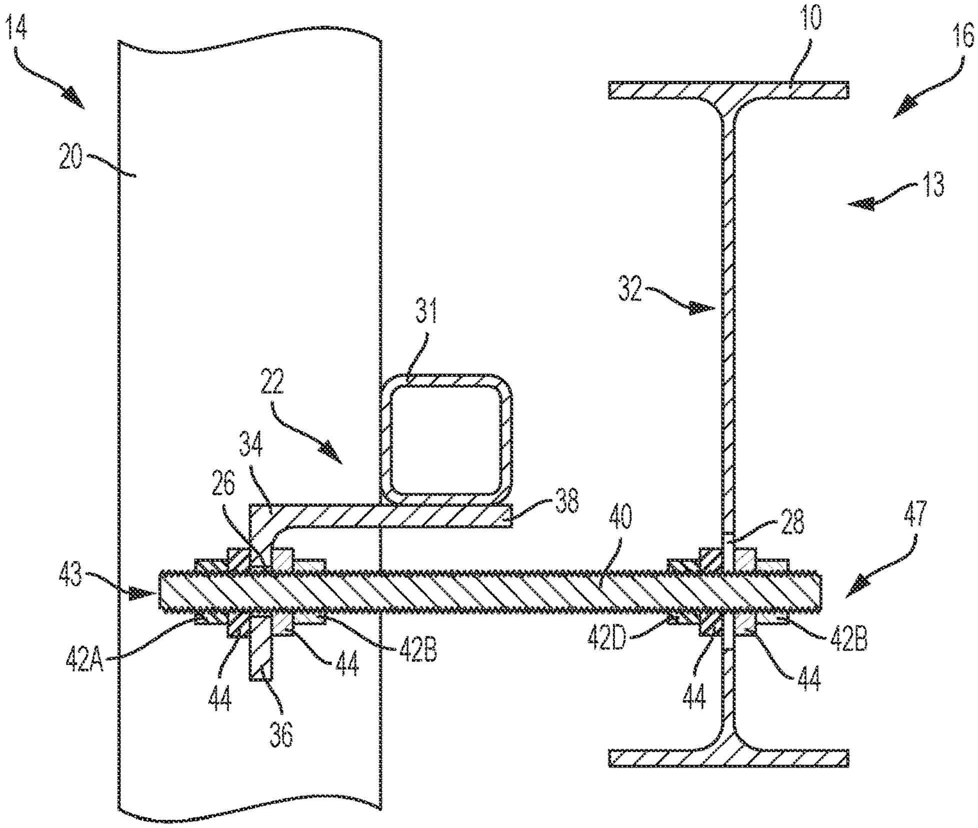
FIG. 8 is a cross-sectional view of the lower attachment point of FIG. 6, along line 8-8 in FIG. 7.

FIGS. 6-8 are several views of a lower attachment point 16, including a slot 26 of strongback 22, a slot 28 of beam 10, and a fastener assembly 30. The two lower attachment points 16 are substantially the same, and the below description may be sufficient to describe both. Lower attachment point 16 is also similar to upper attachment point 18 described above. Accordingly, analogous components may use the same reference numbers. Properties or variations described above may also apply to analogous structures below.

Strongback 22 comprises a square or rectangular tube 31 coupled to studs 20 of wall panel 14. The rectangular tube is directly connected to each of the plurality of studs on an inner side of the wall panel. That is, the rectangular tube is disposed substantially perpendicular to the studs, between the studs and adjacent beam 10. Strongback 22 further includes an angle iron 34 connected to rectangular tube 31, that has a first leg 36 and a second leg 38.

First leg 36, which may be referred to as a vertical face of strongback 22, is parallel to vertical face 32 of beam 10. First leg 36 is also parallel to the inner side of wall panel 14, and studs 20. The first leg may also be described as having an expanse orientated parallel to the primary wall pane of wall panel 14. In some examples, wall panel 14 and/or building frame 13 may vary from planar or square geometry by some tolerance. In such examples, vertical face 32 and first leg 36 may accordingly vary from parallel alignment by a similar tolerance.

Second leg 38 is substantially orthogonal to vertical face 32 and may be connected to tube 31 by welding, screwing, or other appropriate method. Second leg 38 extends sufficiently for first leg 36 to be disposed between two adjacent studs of the plurality of studs 20. Angle iron 34 is also short enough in longitudinal extent that it is be accommodated between the two studs, as shown in FIG. 7. In other words, an extent of angle iron 34 measured in a direction parallel to rectangular tube 31 is less than a spacing between adjacent studs 20.

As shown in FIG. 7, first leg 36 includes a slot 26 with a long axis 27, and vertical face 32 of beam 10 includes a slot 28 with a long axis 29. Long axis 27 is horizontal, while long axis 29 is vertical. The two axes are substantially perpendicular. Slot 26 is spaced from, but aligned with slot 28. Each slot is configured to receive fastener assembly 30.

Slot 26 has a horizontal length, and a vertical width. In the depicted example, slot 26 is approximately ¾ inches in width and 5 inches in length. The vertical width of slot 26 may be appropriate to receive fastener assembly 30. The horizontal length of slot 26 may determine a range of relative range of motion between wall panel 14 and beam 10.

Slot 28 has a vertical length, and a horizontal width. In the depicted example, slot 28 is approximately ¾ inches in width and 3 inches in length. The horizontal width of slot 28 may be appropriate to receive fastener assembly 30. The vertical length of slot 28 may determine a range of relative range of motion between wall panel 14 and beam 10. Location of slot 28 in vertical face 32 may also vary with other dimensions or attributes of the building. In the depicted example, slot 28 is centered approximately 4 inches from the bottom flange of beam 10.

Fastener assembly 30, which may be seen in greatest detail in FIG. 8, includes a threaded rod 40. Rod 40 extends through slot 26 of strongback 22 and slot 28 of beam 10. The rod extends substantially perpendicular to vertical face 32 of beam 10 and to first leg 36 of angle iron 34. Rod 40 may also be described as perpendicular to the plane of wall panel 14. Four nuts 42 are threaded onto the rod to secure fastener assembly 30 relative to strongback 22 and beam 10. Each nut is spaced from the adjacent structural member by a washer 44.

Rod 40 may be described as having a panel end 43 and a beam end 47. A first nut 42A is disposed proximate panel end 43 of rod 40, proximate first leg 36 of angle iron 34. A second nut 42B is also disposed proximate panel end 43 of the rod, on an opposite side of first leg 36 to first nut 42A. In other words, first nut 42A is distal to second nut 42B, on rod 40. Rod 40 is fixed relative to angle iron 34 between the first and second nuts. A third nut 42C is disposed proximate beam end 47 of rod 40, proximate vertical face 32 of beam 10. A fourth nut 42D is also disposed proximate beam end 47 of the rod, on an opposite side of beam 10 to third nut 42C. In other words, third nut 42C is distal to fourth nut 42D, on rod 40. Rod 40 is fixed relative to beam 10 between the third and fourth nuts.

Each nut may be tightened only to 'hand-tight', or to some selected torque value.

In some examples, the beam and/or strongback may include features configured to reduce frictional forces such as smoothed surfaces or welded surface plates. Fastener assembly 30 may include any effective fastener or combination of fasteners.

Rod 40 may be of sufficient length to flex under loads experienced by the building. In the present example, rod 40 is approximately 15 inches in length and ¾ inches in diameter. Locating angle iron 34 between studs 20 may allow a greater length of rod 40 while maintaining a selected spacing between wall panel 14 and beam 10. Rod 40 in lower attachment point 16 may therefore be longer than rod 40 of upper attachment point 18, although the wall panel is consistently spaced from building frame 13.

A wall connection system may further include connections between wall panels, connections between wall panels and glazing panels, and/or between glazing panels Referring again to FIG. 1, connection system 100 attaches wall panel 14 to an adjacent wall panel 15. In the present example, strongback 22 of wall panel 14 is connected to strongback 22 of panel 15. Additionally or alternatively, strongbacks 24, studs 20, and/or any other portion or portions may be connected between wall panels 14 and 15. In many examples, such along an expanse of wall, the outermost studs of two adjacent panels may be connected by screws, welding, or any effective method. In some examples, such as at a building corner or a connection with a glazing panel, strongbacks of two adjacent panels may be connected.

Figure 9:
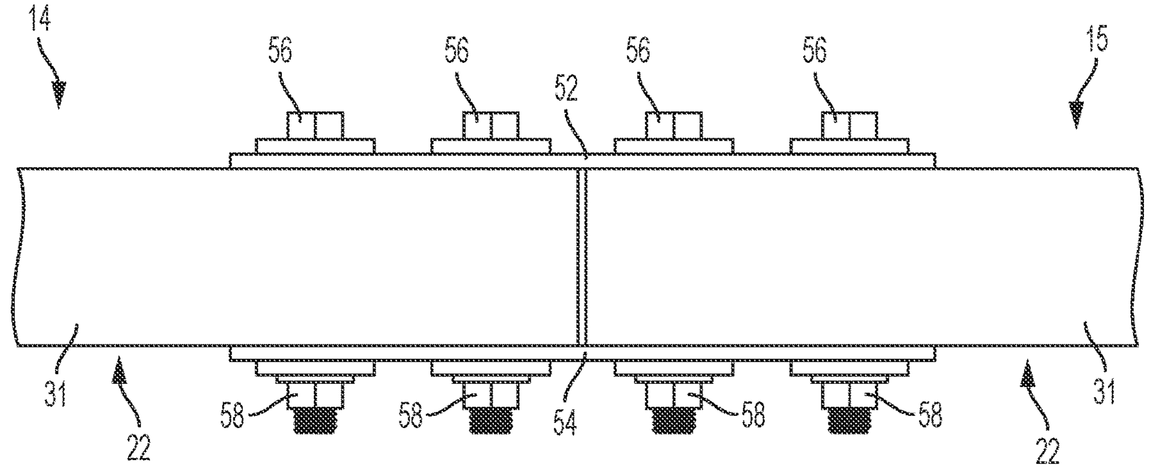
FIG. 9 is an elevation view of an example of an optional connection between two lower strongbacks of the wall connection system of FIG. 1.
Figure 10:
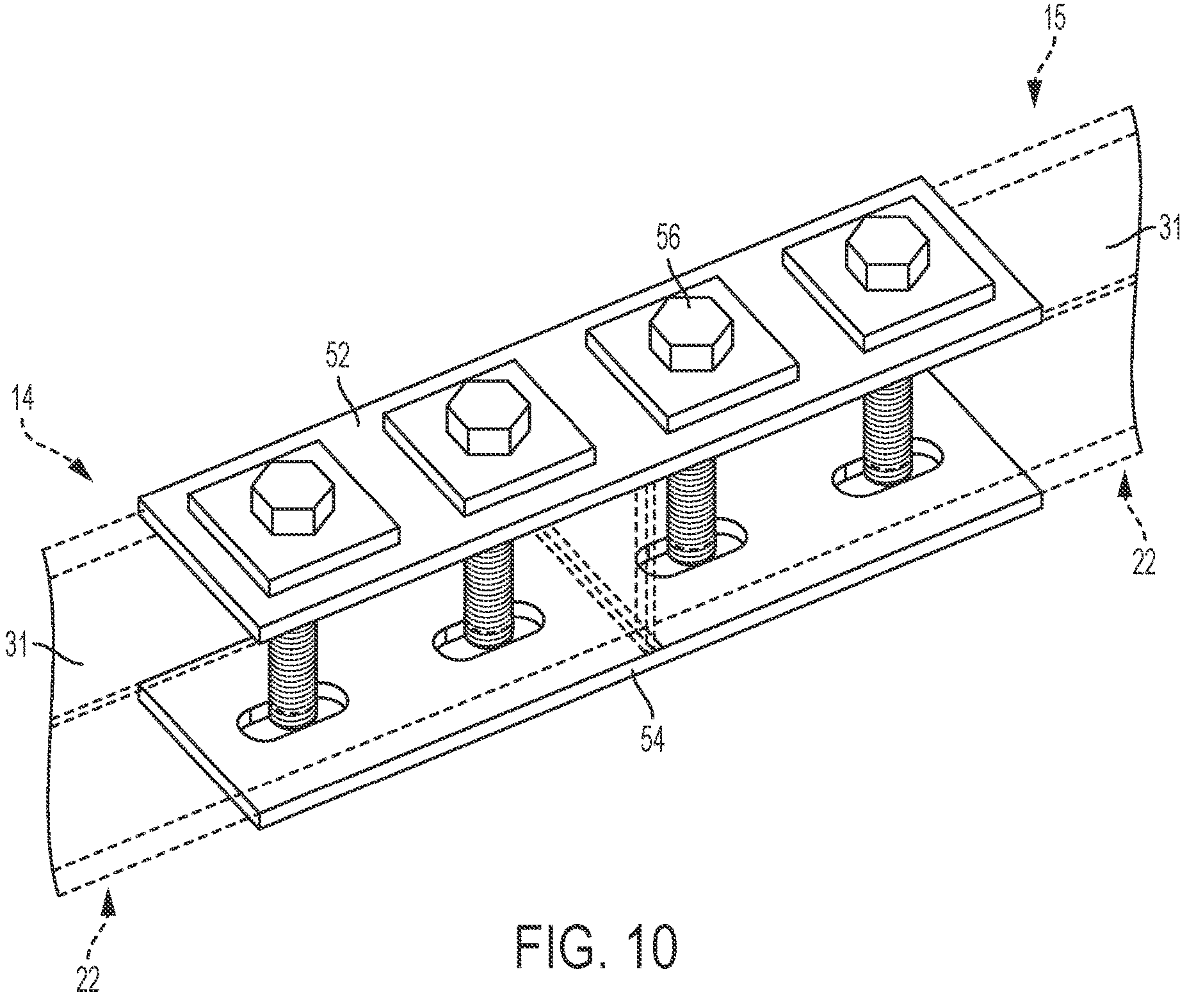
FIG. 10 is a partially transparent isometric view of the strongback connection of FIG. 9.

FIGS. 9-10 show the illustrative connection between strongbacks 22 of wall panels 14, 15 in more detail. In some examples, such a connection may be used between a wall panel and a curtainwall and/or strongfront glazing panel, or between two curtainwall and/or strongfront glazing panels. Rectangular tubes 31 of the strongbacks are disposed parallel to one another, with adjacent ends abutting. An upper bridging plate 52 contacts an upper surface of each tube, spanning between the two tubes. A lower bridging plate 54 is correspondingly disposed in contact with a lower surface of each tube, spanning between the two tubes.

Each bridging plate includes four apertures, spaced to align with two apertures in each rectangular tube 31. In alignment, the apertures of bridging plates 52, 54 and rectangular tubes 31 form four passages, where each passage is configured to receive a bolt 56. Each bolt 56, inserted into a passage through upper bridging plate 52 is of sufficient length for a distal end to extend clear of lower bridging plate 54. A nut 58 threaded on the distal end of each bolt 56 secures the bolt in place, and together the heads of bolts 56 and nuts 58 hold bridging plates 52, 54 against rectangular tubes 31. Washers of any type may be included between the bolt and/or nut, and the bridging plates and/or rectangular tubes. The washers may be configured to secure the connection by locking nuts 58 and/or improving frictional contact of rectangular tube 31 and/or bridging plates 52, 54 with bolts 56.

Upper bridging plate 52 and lower bridging plate 54 may be thereby fixed relative to rectangular tubes 31. The rectangular tubes may in turn be fixed relative to one another. The connection may therefore functionally and/or structurally join strongbacks 22 of wall panel 14 and wall panel 15.

Multiple strongbacks may be joined in series, to join a plurality of wall panels. In some examples, joining panels may allow fewer connection points on each panel. In particular, joining strongbacks may allow an overall reduction in a number of connection points needed to join a plurality of wall panels to a building frame. For example, joining strongbacks 22 of wall panels 14 and 15 may allow use of only one lower connection point 16 per wall panel. For another example, joining strongbacks of three wall panels may allow only the strongbacks of the two outer panels to be connected to the building frame.

Figure 11:
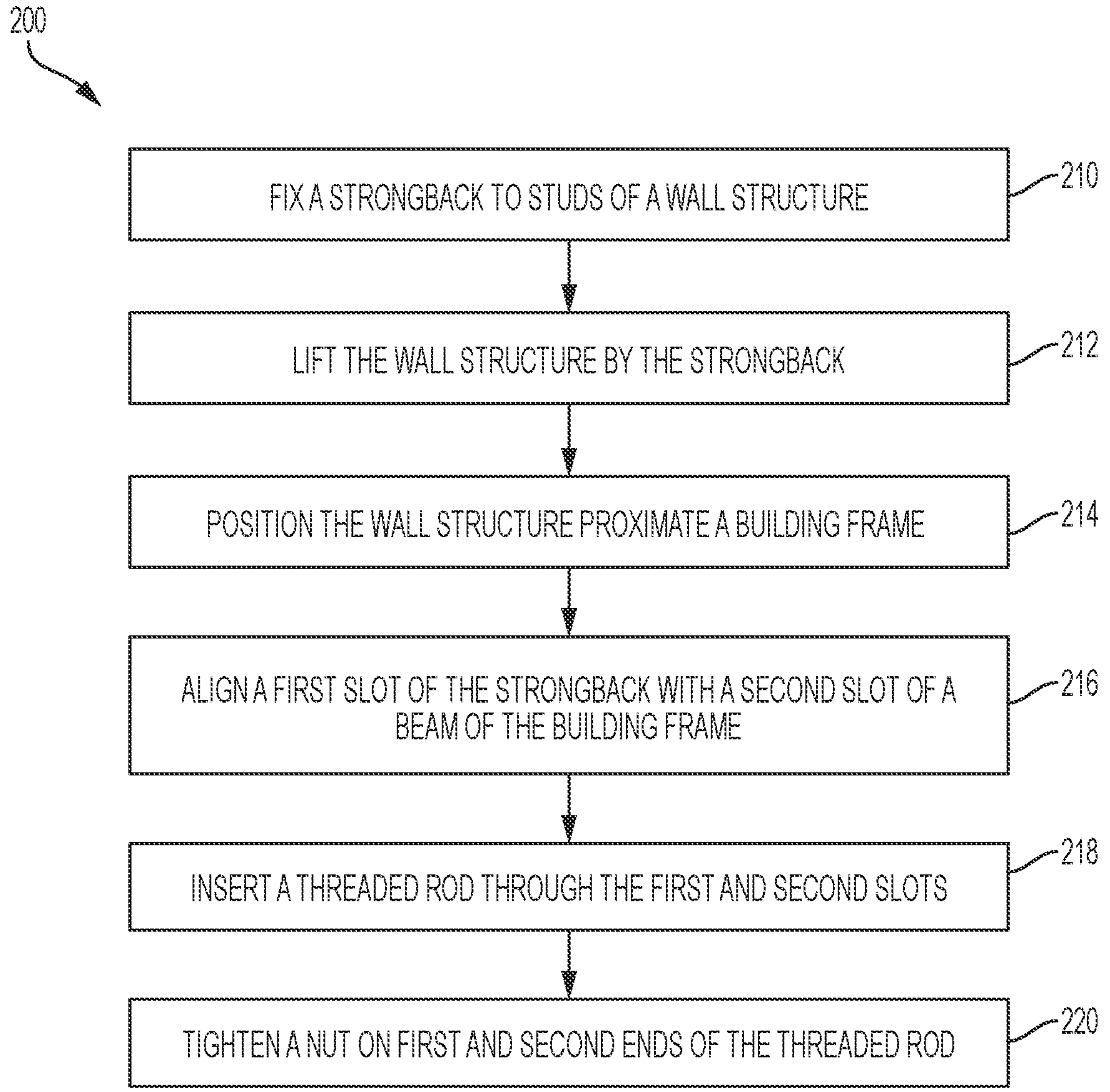
FIG. 11 is a flowchart illustrating a method of wall connection.

FIG. 11 is a flowchart illustrating steps of an illustrative method of connecting a prefabricated wall structure to a building frame. Aspects of the illustrative wall connection system described above may be utilized in the method steps described below. Where appropriate, reference may be made to components and systems that may be used in carrying out each step. These references are for illustration, and are not intended to limit the possible ways of carrying out any particular step of the method.

Although various steps of method 200 are described below and depicted in FIG. 11, the steps need not necessarily all be performed, and in some cases may be performed simultaneously or in a different order than the order shown. FIG. 11 may not recite the complete process or all steps of the method.

At step 210, the method includes fixing a strongback to studs of a wall structure. The wall structure may include a prefabricated wall panel, and the strongback may include any elongate member having one or more slots. The wall structure may include a plurality of parallel studs, or other structural members requiring connection to a building frame. The strongback may comprise steel, timber, or any sufficiently strong material and may be singular or comprised of multiple connected parts. In some examples, the strongback may include one or more sections of angle iron and/or a tube.

Fixing the strongback to the studs may include welding, fastening with screws, bonding, or any effective connection. The strongback may be fixed to each of the plurality of studs of the wall structure. In some examples, step 210 may be performed at the time of manufacture of the prefabricated wall panel. In some examples step 210 may include prefabricating a modular wall structure including a strongback connected to a plurality of parallel studs. In some examples, the strongback may be fixed to a previously manufactured wall panel, in a workshop or other controlled manufacturing environment. Step 210 may be performed prior to delivery of the wall structure to a building site.

Additional preparation of the wall structure may be performed along with step 210. For example, one or more fastener assemblies may be temporarily or permanently connected to the wall structure. The fastener assemblies may be pre-installed through slots of the strongback, or may be separately attached to or stored with the wall structure.

Step 212 includes lifting the wall structure by the strongback. This step may be performed after delivery of the wall structure to a building site. A crane or other lifting equipment may be coupled to the strongback, and used to lift the wall structure. In some examples, the strongback may include a lifting point or other structure configured to facilitate coupling of lifting equipment. In some examples, the wall structure may be lifted by an outer frame, or any appropriate portion.

Step 214 includes positioning the wall structure proximate a building frame. The wall structure may be lifted into approximate alignment alongside the building frame. The building frame may include a horizontal building frame components, or beam. The beam may be of any appropriate material, including but not limited to steel, timber, or precast concrete. The strongback fixed to the wall structure may be aligned generally parallel to and at an elevation matching the beam. A vertical face of the strongback may be aligned parallel to a vertical face of the beam. In some examples, each strongback of the wall structure may be aligned with a beam of the building frame.

At step 216, method 200 includes aligning a first slot of the strongback with a second slot of the beam of the building frame. The first and second slots may each be elongate and may be oriented substantially orthogonal to one another. In some examples, the first slot may be oriented horizontally and the second slot may be oriented vertically. In some examples, multiple pairs of corresponding slots may be concurrently aligned, on one or more strongbacks and one or more beams.

The second slot may be disposed on any vertical face of the beam. For example, the slot may be in a web of an I-beam, or may be in a component coupled to the beam. For beams of some materials, such as timber or precast concrete, the slot may be in metal component fastened to and/or embedded in the beam.

Step 218 includes inserting a threaded rod through the first and second slots. In some examples, the rod may be preinstalled on the strongback, and step 218 may comprise only inserting the rod through the second slot. At step 220, method 200 includes tightening a nut on first and second ends of the threaded rod. Tightening the nuts may secure the rod relative to the strongback and the beam, therefore securing the strongback and beam relative to each other. The rod and nuts may cooperatively resist forces or loads parallel to the rod.

The nuts may be fastened no more than hand-tight. In some examples, the nuts may be fastened to a preselected torque. The nuts may be tightened such that the rod slides in the first and second slots when subjected to seismic forces. In some examples, the nuts may be installed with adhesive to prevent loosening of the nuts. In some examples the threading on the rod distal to the nuts may be deformed or welded to prevent loosening.

In some examples, the nuts may be part of a fastener assembly, which may include the rod and four nuts. A pair of nuts may be installed on either side the first slot of the strongback and on either side of the second slot of the beam. In other words, step 220 may include engaging a first pair of nuts on a first end portion of the rod on opposite sides of the vertical face of the strongback, and engaging a second pair of nuts on a second end portion of the rod on opposite side of the vertical face of the beam. Washers may also be installed between the nuts and the strongback and/or the beam.

In some examples, the wall structure may include sheathing on an exterior face, preventing exterior access to the strongback. In such a case, a worker performing the installation may access the fastener assembly from within the building frame by reaching under the beam and between the plurality of studs.

Steps 218 and 220 may be repeated for additional pairs of corresponding first and second slots, until the wall structure has been sufficiently connected to the building frame.

The different embodiments and examples of the wall connection system and related methods described herein provide several advantages over known solutions for connecting prefabricated wall structures to a building frame. For example, illustrative embodiments and examples described herein require significantly fewer connections to be made between the wall structure and building frame during building erection. Additionally, and among other benefits, illustrative embodiments and examples described herein allow connection of wall panel studs to be done in controlled conditions, to a higher standard than is achievable in the field.

Additionally, and among other benefits, illustrative embodiments and examples described herein produce a more seismically robust building, due to the reduction in connections. After a seismic event, damage may be avoided or limited to the reduced number of connections and require less repair than individually clipped studs. The strongbacks of the illustrative embodiments and examples described herein additional transfer loads away from building corners, which may reduce damage to wall structures in a seismic event.

No known system or device can perform these functions, particularly with standard parts and simple installation. Thus, the illustrative embodiments and examples described herein are particularly useful for faster on-site construction of panelized buildings. However, not all embodiments and examples described herein provide the same advantages or the same degree of advantage.

Additional Examples and Illustrative Combinations

This section describes additional aspects and features of wall connection systems according to the present teachings, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A wall connection system, comprising:

a horizontal building frame component having a first vertical face, the first vertical face having a first slot, a prefabricated wall structure including a plurality of parallel studs, an elongate member connected to each stud of the plurality of parallel studs and having a second vertical face, the second vertical face being parallel to the first vertical face, and having a second slot, a long axis of the first slot being orthogonal to a long axis of the second slot, and a fastener assembly connecting the horizontal building frame component to the wall structure through the slots.

A1. The wall connection system of A0, wherein the horizontal building frame component is an I-beam.

A2. The wall connection system of any of A0-A1, wherein the elongate member includes an angle iron and the second vertical face is on a leg of the angle iron.

A3. The wall connection system of any of A0-A2, wherein the elongate member includes a tube connecting the plurality of studs, and an angle iron member connected to the tube, wherein the angle iron member has the second slot.

A4. The wall connection system of any of A0-A3, wherein the elongate member is an angle iron.

A5. The wall connection system of any of A0-A4, wherein the long axis of the first slot is orthogonal to the long axis of the second slot.

A6. The wall connection system of any of A0-A5, wherein the fastener assembly includes a threaded rod, a first nut threadedly engaging a first end of the rod and a second nut threadedly engaging a second end of the rod.

A7. The wall connection system of any of A0-A5, wherein the fastener assembly includes a threaded rod, a first pair of nuts engaging a first end portion of the rod on opposite sides of the first vertical face, and a second pair of nuts engaging a second end portion of the rod on opposite sides of the second vertical face.

A8. The wall connection system of any of A6-A7, wherein the rod is configured to flex under seismic loads.

A9. The wall connection system of any of A6-A8, wherein the rod is between 1 inch and 1 foot in length.

A10. The wall connection system of any of A0-A9, wherein the wall structure is spaced at least 2 inches from the horizontal building frame component.

A11. The wall connection system of any of A0-A10, wherein the fastener assembly is configured to accommodate both push and pull forces.

A12. The wall connection system of any of A0-A11, wherein the wall connection system includes fewer fastener assemblies than the number of studs of the plurality of parallel studs.

B0. A method of connecting a wall to a building frame, comprising:

prefabricating a modular wall structure including an elongate member connected to a plurality of parallel studs, the elongate member having a first vertical face with a first slot;

lifting the wall structure proximate the building frame with the first vertical face of the elongate member parallel to a second vertical face of a horizontal building frame component, the second vertical face having a second slot, the first slot having an elongate axis orthogonal to an elongate axis of the second slot;

extending a fastener assembly through the first slot and the second slot;

securing the fastener assembly.

B1. The method of B0, wherein the lifting step includes:

lifting the wall structure by the elongate member.

B2. The method of any of B0-B1, wherein the securing step includes:

manually tightening a nut no more than hand-tight.

B3. The method of any of B0-B2, wherein the securing step includes:

engaging a first pair of nuts on a first end portion of a threaded rod on opposite sides of the first vertical face, and engaging a second pair of nuts on a second end portion of the threaded rod on opposite sides of the second vertical face.

B4. The method of any of B0-B3, wherein the prefabricating step includes:

connecting a tube to the plurality of parallel studs.

C0. A modular wall panel assembly comprising:

a plurality of parallel studs defining a primary wall plane, a strongback structure connected orthogonally to the studs, the strongback structure including an expanse oriented parallel to the wall plane, the expanse having a slot configured to receive a threaded rod for fastening the wall panel assembly to a building structure without directly connecting the studs to the building structure.

C1. The modular wall panel assembly of C0, wherein the strongback structure includes a piece of angle iron, the expanse being defined by the piece of angle iron.

C2. The modular wall panel assembly of any of C0-C1, wherein the strongback structure includes a tube and multiple angle iron members connected to the tube, the tube being connected to the studs and each angle iron member having an expanse and a slot in the expanse configured to receive a threaded rod for fastening the wall panel assembly to a building structure without directly connecting the studs to the building structure.

C3. The modular wall panel assembly of any of C0-C2, wherein the strongback structure includes an angle iron component connected to the studs, the angle iron component having an expanse oriented parallel to the wall plane and multiple slots in the expanse configured to receive a threaded rod for fastening the wall panel assembly to a building structure without directly connecting the studs to the building structure.

C4. The modular wall panel assembly of any of C0-C3, wherein the slot is configured to be orthogonal relative to a corresponding slot in a building frame member at a job site.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A wall connection system, comprising:
- a horizontal building frame component having a first vertical face, the first vertical face having a first slot,
- a modular wall panel assembly including:
  - a plurality of at least three parallel studs defining a primary wall plane, and
  - a strongback structure including an angle iron connected orthogonally to each of the plurality of studs, the angle iron including an expanse oriented parallel to the wall plane, the expanse having a second slot that is parallel the primary wall plane, and
- a fastener assembly connecting the horizontal building frame component to the wall panel assembly through the first slot and the second slot, without directly connecting the studs to the building frame component,
- wherein the expanse is parallel to the first vertical face, and a long axis of the first slot is orthogonal to a long axis of the second slot.

2. The wall connection system of claim 1, wherein the horizontal building frame component is an I-beam.

3. The wall connection system of claim 1, wherein the fastener assembly includes a threaded rod, a first nut threadedly engaging a first end of the rod and a second nut threadedly engaging a second end of the rod.

4. The wall connection system of claim 3, wherein the rod is configured to flex under seismic loads.

5. The wall connection system of claim 1, wherein the fastener assembly includes a threaded rod, a first pair of nuts engaging a first end portion of the rod on opposite sides of the first vertical face, and a second pair of nuts engaging a second end portion of the rod on opposite sides of the expanse.

6. The wall connection system of claim 1, wherein the wall panel assembly is spaced at least 2 inches from the horizontal building frame component.

7. The wall connection system of claim 1, wherein the fastener assembly is configured to accommodate both push and pull forces.

8. The wall connection system of claim 1, wherein the wall connection system includes fewer fastener assemblies than the number of studs of the plurality of parallel studs.

9. The wall connection system of claim 1, wherein the expanse of the angle iron has multiple slots, each configured to receive the fastener assembly for fastening the wall panel assembly to a building structure without directly connecting the studs to the building structure.

10. The wall connection system of claim 1, wherein the number of second slots in the strongback structure is at least two less than the number of the plurality of parallel studs.

11. The wall connection system of claim 1, wherein the angle iron is fixed in contact with each of the plurality of parallel studs.

12. A wall connection system, comprising:
- a horizontal building frame component having a vertical face, the vertical face having a slot,
- a modular wall panel assembly including:
  - a plurality of at least three parallel studs defining a primary wall plane, and
  - a strongback structure including an aperture and connected orthogonally to each of the plurality of studs, and
- a fastener assembly connecting the horizontal building frame component to the wall panel assembly through the slot and the aperture, without directly connecting the studs to the building frame component,
- wherein the primary wall plane is parallel to the vertical face.

13. The wall connections system of claim 12, wherein the strongback structure includes a rectangular tube.

14. The wall connection system of claim 13, wherein the plurality of studs are metal, and the tube is welded to each of the studs.

15. The wall connection system of claim 12, wherein the slot of the horizontal building frame component has a horizontal long axis.

16. The wall connection system of claim 15, wherein the aperture of the strongback structure is a slot.

17. The wall connection system of claim 12, wherein the strongback structure is connected to each of the plurality of studs at a position spaced from a top end and a bottom end of the stud.

18. The wall connection system of claim 12, wherein the fastener assembly includes a threaded rod and at least one pair of nuts engaging the rod.

19. A wall connection system, comprising:

a horizontal building frame component having a vertical face, the vertical face having a horizontal slot, a modular wall panel assembly including:

a plurality of at least three parallel studs defining a primary wall plane, and a strongback structure including a rectangular tube parallel to the primary wall plane and orthogonal to the studs, the rectangular tube being directly connected to each of the studs and having an aperture, and a fastener assembly connecting the horizontal building frame component to the wall panel assembly through the slot and the aperture, without directly connecting the studs to the building frame component.

* * * * *